US009879542B2

(12) United States Patent
Xu

(10) Patent No.: US 9,879,542 B2
(45) Date of Patent: Jan. 30, 2018

(54) PLATFORM WITH CURVED EDGES ADJACENT SUCTION SIDE OF AIRFOIL

(71) Applicant: United Technologies Corporation, Hartford, CT (US)

(72) Inventor: JinQuan Xu, East Greenwich, RI (US)

(73) Assignee: United Technologies Corporation, Hartford, CT (US)

( * ) Notice: Subject to any disclaimer, the term of this patent is extended or adjusted under 35 U.S.C. 154(b) by 220 days.

(21) Appl. No.: 14/652,651

(22) PCT Filed: Feb. 12, 2013

(86) PCT No.: PCT/US2013/025738
§ 371 (c)(1),
(2) Date: Jun. 16, 2015

(87) PCT Pub. No.: WO2014/105102
PCT Pub. Date: Jul. 3, 2014

(65) Prior Publication Data

US 2015/0337666 A1 Nov. 26, 2015

Related U.S. Application Data

(60) Provisional application No. 61/746,610, filed on Dec. 28, 2012.

(51) Int. Cl.
*F01D 5/14* (2006.01)
*F01D 9/04* (2006.01)
(Continued)

(52) U.S. Cl.
CPC ............. *F01D 5/147* (2013.01); *F01D 5/021* (2013.01); *F01D 5/143* (2013.01); *F01D 5/145* (2013.01);
(Continued)

(58) Field of Classification Search
CPC ........... F01D 5/141; F01D 5/143; F01D 5/145
(Continued)

(56) References Cited

U.S. PATENT DOCUMENTS 4,420,288 A 12/1983 Bischoff
6,561,761 B1 5/2003 Decker et al.
(Continued)

FOREIGN PATENT DOCUMENTS

EP 2423437 A2 2/2012
EP 2423438 A2 2/2012
(Continued)

OTHER PUBLICATIONS

International Search Report and Written Opinion from PCT Application Serial No. PCT/US2013/025741, dated Sep. 23, 2013, 16 pages.
(Continued)

*Primary Examiner* — Matthew W Jellett
(74) *Attorney, Agent, or Firm* — Kinney & Lange, P.A.

(57) ABSTRACT

A gas turbine engine component includes an airfoil and a platform. The airfoil has a pressure side and an opposite suction side. The platform is connected to the airfoil and has a first curved edge adjacent the suction side and a second curved edge spaced from the pressure side such that more than half of the platform is located to the pressure side. The platform located to the pressure side has a non-axisymmetrical surface contouring.

15 Claims, 2 Drawing Sheets

(51) Int. Cl.
*F01D 5/02* (2006.01)
*F01D 9/02* (2006.01)

(52) U.S. Cl.
CPC ............... *F01D 9/02* (2013.01); *F01D 9/041* (2013.01); *F05D 2220/32* (2013.01); *F05D 2240/12* (2013.01); *F05D 2240/30* (2013.01); *F05D 2240/80* (2013.01); *Y02T 50/673* (2013.01)

(58) Field of Classification Search
USPC .......................................................... 415/191
See application file for complete search history.

(56) References Cited

U.S. PATENT DOCUMENTS

| | | | | |
|---|---|---|---|---|
| 7,217,096 | B2 | 5/2007 | Lee | |
| 7,220,100 | B2 * | 5/2007 | Lee | F01D 5/143 415/191 |
| 8,657,579 | B2 * | 2/2014 | Reno | F01D 5/143 415/209.4 |
| 8,961,135 | B2 * | 2/2015 | Beeck | F01D 5/143 416/193 A |
| 9,103,213 | B2 * | 8/2015 | Barr | F01D 5/143 |
| 9,175,567 | B2 * | 11/2015 | Aggarwala | F01D 5/143 |
| 9,194,235 | B2 * | 11/2015 | Wunderer | F01D 5/145 |
| 2006/0233641 | A1 | 10/2006 | Lee et al. | |
| 2007/0059177 | A1 | 3/2007 | Harvey | |
| 2010/0080708 | A1 | 4/2010 | Gupta et al. | |
| 2010/0143139 | A1 | 6/2010 | Pandey et al. | |
| 2010/0158696 | A1 | 6/2010 | Pandey et al. | |
| 2010/0166558 | A1 | 7/2010 | Siden et al. | |
| 2012/0051894 | A1 | 3/2012 | Clements et al. | |
| 2012/0051930 | A1 | 3/2012 | Pandey et al. | |

FOREIGN PATENT DOCUMENTS

| | | | |
|---|---|---|---|
| FR | 2928172 | A1 | 9/2009 |
| GB | 2042675 | A | 9/1980 |

OTHER PUBLICATIONS

Extended European Search Report for EP Application No. 13868671.2, dated Nov. 26, 2015, 7 pages.

* cited by examiner

PLATFORM WITH CURVED EDGES ADJACENT SUCTION SIDE OF AIRFOIL

BACKGROUND

The present disclosure relates to gas turbine engines. More particularly, the present disclosure relates to a platform of a vane and/or blade for a gas turbine engine.

A typical gas turbine engine includes a compressor section, a combustor section, and a turbine section fluidly connected along a main gas flow path. A gas (air) enters the main gas flow path, is pressurized in the compressor section and mixed with fuel in the combustor section. The mixture of gas and fuel is ignited in the combustor section to generate hot combustion gases. The turbine section is disposed downstream of the combustor section to receive the hot combustion gases. The turbine section extracts energy from the combustion gases to power the compressor. In turbofan aircraft applications, the turbine section also powers a fan. In marine or industrial applications, the turbine section powers an external drive shaft.

In an axial flow gas turbine engine, the turbine section and the compressor section are divided into stages, each stage is typically comprised of a plurality circumferentially arranged vane or blade structures. The blades are mounted to one or more hubs capable of rotation about an engine axis and the vanes are stator components that are mounted to structures such as the engine casing.

The blades and vanes include an airfoil and one or more platforms, also called endwalls. In most cases, the platforms are arranged adjacent each other to partially define a radially inner boundary of the annular main gas flow path for the gas turbine engine. The airfoils span across the main gas flow path so that the airfoil tips are in close proximity to a non-rotatable casing (in the case of rotor blades) or connect to a radially outer platform that defines a radially outer boundary of the annular main gas flow path.

During engine operation, gas (air and/or combustion gases) flows through the main gas flow path. Near the endwalls, the gas flow is dominated by a vortical flow structure known as a horseshoe vortex. The vortex forms as a result of the endwall boundary layer, which separates from the endwall as the fluid approaches the leading edges of the airfoils. The separated gas reorganizes into the horseshoe vortex. There is a high loss of efficiency associated with the vortex. The loss, commonly referred to as "secondary" or "endwall" loss, is responsible for significant efficiency loss in a row of airfoils.

SUMMARY

A gas turbine engine component includes an airfoil and a platform. The airfoil has a pressure side and an opposite suction side. The platform is connected to the airfoil and has a first curved edge adjacent the suction side and a second curved edge spaced from the pressure side such that more than half of the platform is located to the pressure side. The platform located to the pressure side has a non-axisymmetrical surface contouring.

A stage for a gas turbine engine includes a row of airfoils and a platform attached to each airfoil. Each airfoil has a pressure side and an opposite suction side. Each platform has a first curved edge adjacent the suction side and a second curved edge spaced from the pressure side such that more than half of the platform is located to the pressure side. The platform located to the pressure side has both a convex region and a concave region.

DETAILED DESCRIPTION

The present disclosure describes vanes and/or blades with platforms having curved edges. In one embodiment, one curved edge of the platform is slightly offset from but approximates the curvature of a widest portion of a suction side of an airfoil. As a result of the curved edge extending adjacent the airfoil, the majority of the platform is disposed to a pressure side of the airfoil rather than to the suction side. The curved edges allow the gas turbine engine to be more efficient by reducing gas flow penetration from the main gas flow path through gaps between adjacent platforms. Additionally, the curved edges act to increase the operational life of the platform by disposing the edges away from an area of higher temperature adjacent the suction side of the airfoil. In some instances, curved edge platforms are easier to manufacture, thereby reducing the cost and time associated with fabricating the platforms.

Figure 1:
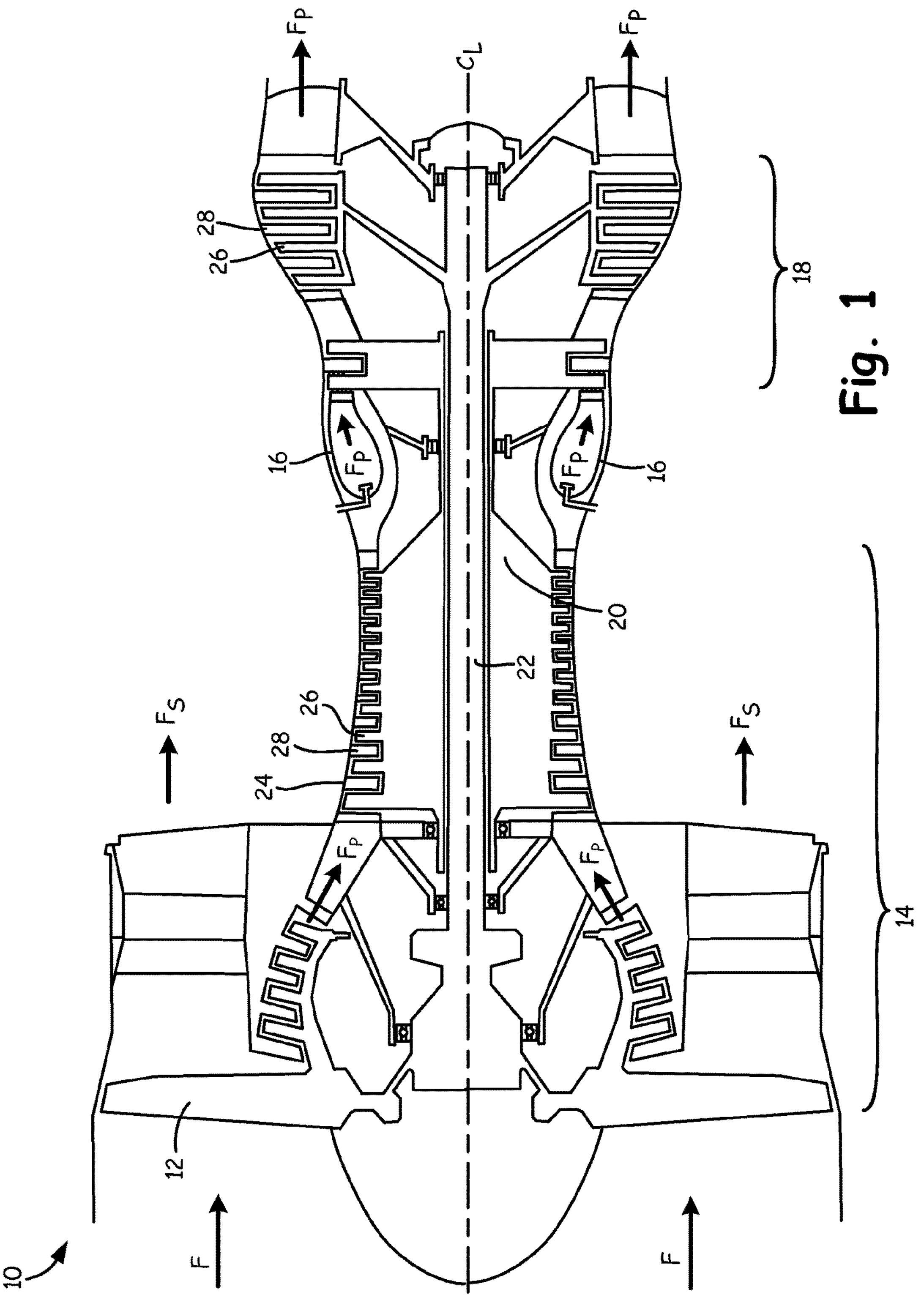
FIG. 1 is a cross-sectional view of a gas turbine engine according to an embodiment of the present invention.

FIG. 1 is a longitudinal sectional view along an engine center line $C_L$ of a gas turbine engine 10. FIG. 1 shows gas turbine engine 10 including a fan blade 12, a compressor 14, a combustor 16, a turbine 18, a high-pressure rotor 20, a low-pressure rotor 22, and an engine casing 24. Compressor 14 and turbine 18 include rotor stages 26 and stator stages 28.

As illustrated in FIG. 1, fan blade 12 extends from engine center line $C_L$ near a forward end of gas turbine engine 10. Compressor 14 is disposed aft of fan blade 12 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan blade 12 and a high-pressure section of compressor 14. Rotor stages 26 and stator stages 28 are arranged throughout compressor 14 and turbine 18 in alternating rows. Thus, rotor stages 26 connect to high-pressure rotor 20 and low-pressure rotor 22. Engine casing 24 surrounds turbine engine 10 providing structural support for compressor 14, combustor 16, and turbine 18, as well as containment for gas flow through engine 10.

In operation, gas flow F is divided into primary gas flow Fp and secondary (bypass) gas flow Fs. Primary gas flow Fp enters compressor 14 after passing between fan blades 12. Primary gas flow Fp travels along a main gas flow path and is compressed by the rotation of compressor 14 driven by high-pressure turbine 18. The compressed gas from compressor 14 is divided, with a portion going to combustor 16 and a portion employed for cooling components, buffering, and other purposes. Compressed gas and fuel are mixed and ignited in combustor 16 to produce high-temperature, high-pressure combustion gases. Combustion gases, which are part of primary gas flow Fp exit combustor 16 into turbine section 18.

Stator stages 28 properly align primary gas flow Fp for an efficient attack angle on subsequent rotor stages 26. Primary gas flow Fp passes rotor stages 26 and drives rotation of both high-pressure rotor 20 and low-pressure rotor 22. High-pressure rotor 20 drives a high-pressure portion of compressor 14, as noted above, and low-pressure rotor 22 drives fan blades 12 to produce thrust with bypass gas flow Fs from gas turbine engine 10.

Although embodiments of the present invention are illustrated for a turbofan gas turbine engine for aviation use, it is understood that the present invention applies to other aviation gas turbine engines, to industrial gas turbine engines, and gas turbine engines for marine applications.

Figure 2A:
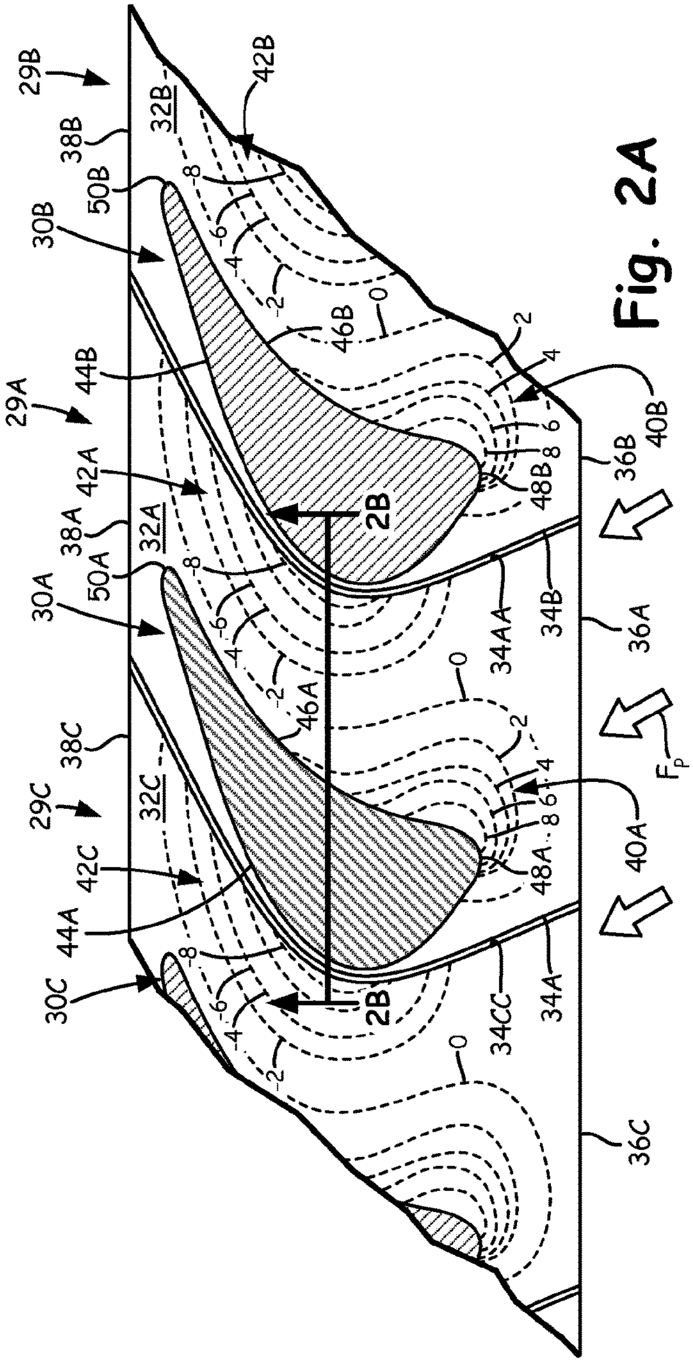
FIG. 2A shows a portion of a rotor or stator stage with a plurality of airfoils and one embodiment of platforms having curved edges.

Although platforms with curved edges can be used with either a rotor or stator stage, in FIG. 2A the platforms with curved edges are shown in reference to a rotor stage. Thus, rotor blade 29A and portions of adjacent rotor blades 29B and 29C are illustrated. Rotor blade 29A includes an airfoil 30A and a platform 32A. Platform 32A includes a first curved edge 34A, a leading edge 36A, a trailing edge 38A, a convex region 40A, and a concave region 42A. Airfoil 30A includes a suction side 44A, a pressure side 46A, a leading edge 48A, and a trailing edge 50A. Similarly, rotor blade 29B includes an airfoil 30B and a platform 32B. Platform 32B includes a first curved edge 34B, a second curved edge 34BB, a leading edge 36B, a trailing edge 38B, a convex region 40B, and a concave region 42B. Airfoil 30B includes a suction side 44B, a pressure side 46B, a leading edge 48B, and a trailing edge 50B. The portion of rotor blade 29C illustrated in FIG. 2A includes a portion of an airfoil 30C, a platform 32C, a curved edge 34CC, a leading edge 36C, a trailing edge 38C, and a concave region 42C. Primary gas flow Fp passes across blades 29A-29C, and therefore, the embodiment described herein is applicable to both turbine 18 (FIG. 1) and compressor 14 (FIG. 1). Similarly, the embodiment described can be used with rotor blades as well as stator vanes. As used herein, leading edge is a transition edge of airfoil between suction side and pressure side where gas flow Fp divides before flowing downstream to either suction side or pressure side of airfoil. Thus, leading edge comprises an upstream edge of airfoil with respect to the direction of gas flow Fp. Similarly, trailing edge is a transition edge of airfoil between suction side and pressure side where gas flow Fp can recombine after exiting between adjacent airfoils. Trailing edge comprises a downstream most edge of airfoil with respect to the direction of gas flow Fp.

Airfoils 30A and 30B can comprise a hollow or solid structures and are connected to respective platforms 32A and 32B. Airfoils 30A and 30B extend generally radially from platforms 32A and 32B, respectively. In one embodiment, airfoils 30A and 30B can be connected to platforms 32A and 32B by dovetail roots (not shown), which are received in slots (not shown) below platforms 32A and 32B. In other embodiments, airfoils 30A and 30B can be integrally joined with platforms 32A and 32B. Suction side 44A of airfoil 30A comprises a generally convex shaped surface that spans from leading edge 48A to trailing edge 50A. Pressure side 46A is disposed opposite to suction side 44A and comprises a generally concave shaped surface that extends from leading edge 48A to trailing edge 50A.

Together platforms 32A-32C span a portion of the circumference of engine 10 (FIG. 1) about centerline axis $C_L$. Platform 32A is disposed between platform 32B and platform 32C. All three platforms 32A-32C have substantially the same shape and are arranged to complement one another. First curved edge 34A is disposed adjacent curved edge 34CC of platform 32C. As shown in FIG. 2A, first curved edge 34A and curved edge 34CC extend generally axially as well as circumferentially with respect to centerline axis $C_L$ of engine 10. Second curved edge 34AA is disposed adjacent curved edge 34B of platform 32B. Second curved edge 34AA and curved edge 34B extend generally axially as well as circumferentially with respect to centerline axis $C_L$ of engine 10. As shown in FIG. 2A, second curved edge 34AA is disposed to pressure side 46A of airfoil 30A and extends through concave region 42A while first curved edge 34A is disposed adjacent airfoil 30A. Platform 32A extends between leading edge 36A and trailing edge 38A.

Curved edges such as first and second curved edges 34A and 34AA allow gas turbine engine 10 (FIG. 1) to be more efficient by reducing gas flow penetration from the main gas flow path through gaps between adjacent platforms. Additionally, curved edges such as first and second curved edges 34A and 34AA act to increase the operational life of the platform by disposing the curved edges away from an area of higher temperature adjacent the suction side of the airfoil.

In the embodiment of FIG. 2A, platforms 32A, 32B, and 32C are sloped or curved. With regard to platform 32A, convex region 40A, denoted by positive elevation contour lines (isolines), is disposed adjacent to and around the leading edge 48A of platform 32A. Concave region 42A, denoted by negative elevation contour lines, transitions from convex region 40A to second curved edge 34AA. As used herein, the neutral elevation (connoted by 0 elevation) represents a surface location along the platform 32A with a radial distance from the centerline axis $C_L$ of the gas turbine engine that is the same as a hypothetical axisymmetrical reference platform surface 52 that does not utilize endwall contouring. Thus, at the same axial location along centerline axis $C_L$ the hypothetical axisymmetrical reference platform surface 52 would have a generally uniform radial distance from centerline axis $C_L$ and is without contouring features such as protrusions or depressions. As shown in FIG. 2A, convex region 40A rises outwardly in elevation from the neutral elevation (0), whereas concave region 42A extends below the neutral elevation (0). The precise locations, contours, and number of concave region 42A and convex region 40A may vary depending upon operational criteria and location of the platform within gas turbine engine 10. Computational fluid dynamic analysis can be used to define the specific location and contours of the platforms for weakening the horseshoe vortices to improve engine efficiency.

In the embodiment of FIG. 2A, first curved edge 34A is disposed adjacent to but is offset from suction side 44A of airfoil 30A. As a result of this configuration, first curved edge 34A is offset from but mirrors a curvature of a portion of suction side 44A of airfoil 30A. As shown in FIG. 2A, first curved edge 34A extends substantially parallel with the curvature of suction side 44A in a widest portion of airfoil 30A, for example, between about 10 and 70 percent of a cord length of airfoil 30A. As a result of this arrangement, platform 32A is offset toward pressure side 46A of airfoil 30A and has both convex region 40A and concave region 42A located to pressure side 46A of airfoil 30A.

Figure 2B:
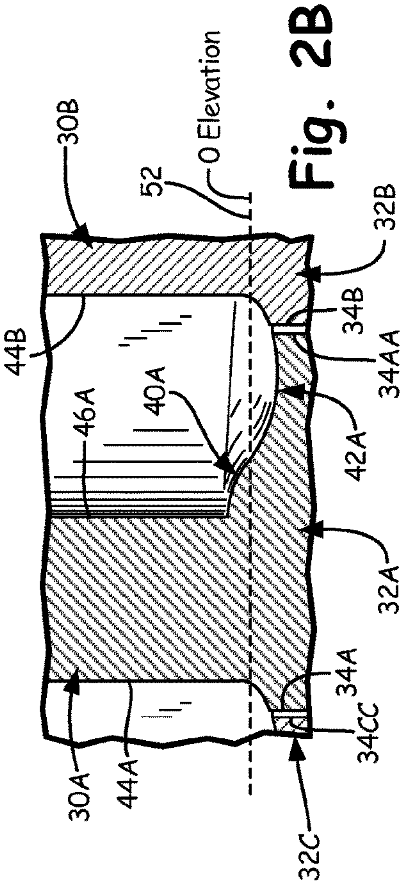
FIG. 2B is a cross-sectional view through the platforms of FIG. 2A illustrating both convex and concave sections located to a pressure side of the airfoil.

FIG. 2B shows a cross-section of airfoil 30A and platform 32A as well as a portion of airfoil 30B, platform 32B, and platform 32C. The neutral elevation surface (denoted as 0 elevation) is illustrated with a dashed line. For ease of illustration in FIG. 2B, the 0 elevation line is shown by as dashed line as a planar surface although it actually is an arcuate shape. As shown in FIG. 2B, airfoil 30A includes suction side 44A and pressure side 46A. Platform 32A includes first curved edge 34A, second curved edge 34AA, convex region 40A and concave region 42A. Airfoil 30B includes suction side 44B. Platform 32B includes curved edge 34B. FIG. 2B also illustrates curved edge 34CC of platform 32C.

As shown in FIG. 2B, first curved edge 34A is disposed adjacent suction side 44A and is spaced by a gap from curved edge 34CC. Similarly, second curved edge 34AA extends through and delimits the edge of concave region 42A. Second curved edge 34AA extends to adjacent airfoil 30B and is spaced by a gap from curved edge 34B of platform 32B. Although not shown in the embodiment of FIG. 2B, first curved edge 34A may not extend only generally radially with respect to engine centerline $C_L$. Rather, first curved edge 34A can be angled diagonally so as to extend both radially and circumferentially with respect to engine centerline $C_L$.

As discussed previously, both convex region 40A and concave region 42A are located to pressure side 46A of airfoil 30A. Concave region 42A extends to second curved edge 34AA. Convex region 40A is located immediately adjacent pressure side 46A of airfoil 30A and extends laterally away therefrom to connect to concave region 42A. In other embodiments, concave region 42A can be spaced away from second curved edge 34AA and/or convex region 40A can be spaced away from pressure side 46A and/or concave region 42A. In the embodiment shown, platform 30A has neither a concave region nor a convex region located to suction side of the airfoil 30A. In other embodiments, platforms such as platforms 30A and 30B may have concave regions to both suction side 44A and pressure side 46A such that concave regions complement one another to provide for a smooth transition therebetween. In other embodiments, rather than having one convex region and one concave region, other contoured platform geometries can be used with the curved edges described. For example, platform contouring can be entirely concave (comprise one large concave region) or entirely convex (comprise one large convex region) per platform. In another example, the platform contouring can include several concave regions and several convex regions per platform.

The present application discloses vanes and/or blades with platforms having curved edges. In one embodiment, one curved edge of the platform is slightly offset from but approximates the curvature of a widest portion of a suction side of an airfoil. As a result of the curved edge extending adjacent the airfoil, the majority of the platform is disposed to a pressure side of the airfoil rather than to the suction side. The curved edges allow the gas turbine engine to be more efficient by reducing gas flow penetration from the main gas flow path through gaps between adjacent platforms. Additionally, the curved edges act to increase the operational life of the platform by disposing the edges away from an area of higher temperature adjacent the suction side of the airfoil. In some instances, curved edge platforms are easier to manufacture, thereby reducing the cost and time associated with fabricating the platforms.

DISCUSSION OF POSSIBLE EMBODIMENTS

The following are non-exclusive descriptions of possible embodiments of the present invention.

A gas turbine engine component includes an airfoil and a platform. The airfoil has a pressure side and an opposite suction side. The platform is connected to the airfoil and has a first curved edge adjacent the suction side and a second curved edge spaced from the pressure side such that more than half of the platform is located to the pressure side. The platform located to the pressure side has a non-axisymmetrical surface contouring.

The component of the preceding paragraph can optionally include, additionally and/or alternatively, any one or more of the following features, configurations and/or additional components:

- the non-axisymmetrical surface contouring includes both a convex region and a concave region;
- a curvature of the first curved edge mirrors a curvature of a portion of the suction side;
- the first curved edge extends parallel with the curvature of the suction side between about ten and seventy percent of a cord length measured from a leading edge of the airfoil;
- the non-axisymmetrical surface contouring to the pressure side comprises all of the surface contouring of the platform;
- the non-axisymmetrical surface contouring to the pressure side extends between a leading edge of the airfoil and the second curved edge;
- a convex region is immediately adjacent the pressure side of the airfoil;
- a concave region is immediately adjacent the second curved edge;
- the platform has neither a concave region nor a convex region between the suction side and the first curved edge;
- the component comprises a stator vane or a rotor blade;
- the platform comprises an outer radial platform; and
- the platform comprises an inner radial platform.

A stage for a gas turbine engine includes a row of airfoils and a platform attached to each airfoil. Each airfoil has a pressure side and an opposite suction side. Each platform has a first curved edge adjacent the suction side and a second curved edge spaced from the pressure side such that more than half of the platform is located to the pressure side. The platform located to the pressure side has both a convex region and a concave region.

The stage of the preceding paragraph can optionally include, additionally and/or alternatively, any one or more of the following features, configurations and/or additional components:

- a curvature of the first curved edge mirrors a curvature of a portion of the suction side;
- the first curved edge extends parallel with the curvature of the suction side between about ten and seventy percent of a cord length measured from a leading edge of the airfoil;
- the convex region and the concave region to the pressure side comprises all surface contouring of the platform;
- the convex region and the concave region to the pressure side extends between a leading edge of the airfoil and the second curved edge;
- the convex region is immediately adjacent the pressure side of the airfoil;
- the concave region is immediately adjacent the second curved edge; and
- the platform has neither a concave region nor a convex region between the suction side and the first curved edge.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:

an airfoil having a pressure side and an opposite suction side; and a platform connected to the airfoil having a first curved edge that is adjacent the suction side and a second curved edge spaced from the pressure side such that more than half of the platform is located to the pressure side and has a non-axisymmetrical surface contouring, wherein the first curved edge extends parallel with the curvature of the suction side between about ten and seventy percent of a cord length measured from a leading edge of the airfoil, and wherein the platform has neither a concave region nor a convex region between the suction side and the first curved edge.

2. The component of claim 1, wherein the non-axisymmetrical surface contouring includes both a convex region and a concave region.

3. The component of claim 1, wherein the non-axisymmetrical surface contouring to the pressure side comprises all of the surface contouring of the platform.

4. The component of claim 1, wherein the non-axisymmetrical surface contouring to the pressure side extends between a leading edge of the airfoil and the second curved edge.

5. The component of claim 1, wherein a convex region is immediately adjacent the pressure side of the airfoil.

6. The component of claim 1, wherein a concave region is immediately adjacent the second curved edge.

7. The component of claim 1, wherein the component comprises a stator vane or a rotor blade.

8. The component of claim 7, wherein the platform comprises an outer radial platform.

9. The component of claim 7, wherein the platform comprises an inner radial platform.

10. A stage for a gas turbine engine comprising:

a row of airfoils spaced apart from one another to define flow channels therebetween, wherein each airfoil has a pressure side and an opposite suction side;

a platform attached to each airfoil, each platform having a first curved edge adjacent the suction side and a second curved edge spaced from the pressure side, wherein more than half of the platform is located to the pressure side and has both a convex region and a concave region, wherein the first curved edge extends parallel with the curvature of the suction side between about ten and seventy percent of a cord length measured from a leading edge of the airfoil, and wherein the platform has neither a concave region nor a convex region between the suction side and the first curved edge.

11. The stage of claim 10, wherein the convex region and the concave region to the pressure side comprise all surface contouring of the platform.

12. The stage of claim 10, wherein the convex region and the concave region to the pressure side extend between a leading edge of the airfoil and the second curved edge.

13. The stage of claim 10, wherein the convex region is immediately adjacent the pressure side of the airfoil.

14. The stage of claim 10, wherein the concave region is immediately adjacent the second curved edge.

15. A gas turbine engine component comprising:

an airfoil having a pressure side and an opposite suction side; and a platform connected to the airfoil having a first curved edge that is adjacent the suction side and a second curved edge spaced from the pressure side such that more than half of the platform is located to the pressure side, wherein the platform has a non-axisymmetrical surface contouring, and wherein the non-axisymmetrical surface contouring comprises one large concave region or one large convex region.

* * * * *